Sept. 15, 1970 L. A. GANT 3,528,679
SUSPENSION DEVICE
Filed March 5, 1968 2 Sheets-Sheet 1

LAWRENCE A. GANT
INVENTOR.

BY H.M. Saragovitz
E.J. Kelly, H. Berl
and J.J. Swartz
ATTORNEYS

Sept. 15, 1970          L. A. GANT          3,528,679

SUSPENSION DEVICE

Filed March 5, 1968          2 Sheets-Sheet 2

LAWRENCE A. GANT
INVENTOR.

BY H. M. Saragovitz
E. J. Kelly, H. Berl
and J. J. Swartz

ATTORNEYS

United States Patent Office 3,528,679
Patented Sept. 15, 1970

3,528,679
SUSPENSION DEVICE
Lawrence A. Gant, 20348 Anita Ave.,
Harper Woods, Mich. 48236
Filed Mar. 5, 1968, Ser. No. 710,456
Int. Cl. B60g 25/00, 9/00
U.S. Cl. 280—124     1 Claim

ABSTRACT OF THE DISCLOSURE

A suspension device to improve vehicle mobility comprising means disposed above a vehicle tire to limit and cushion its extreme vertical displacement by contact therewith. Interruption of the vertical movement compresses the tire thereby cushioning and dampening its passage.

---

The invention described herein may be manufactured, used and licensed by or for the Government for governmental purposes without payment to me of any royalties thereon.

This invention relates to high mobility wheeled vehicles. More particularly, this invention relates to a suspension device for improving vehicle mobility.

In a normal suspension system, there may exist many different devices which improve riding stability such as a coil spring, a leaf spring, and/or the tires on which the vehicle is transported. When vehicles utilizing these prior are devices encounter irregularities in the traversed surface, however, they tend to "bounce" or oscillate in a vertical direction. To eliminate this problem, shock-absorbing devices were mounted on the vehicle in order to absorb the oscillatory movement of the vehicle. Although this had many advantages, it also had many disadvantages and did not completely eliminate all of the "bounce" introduced into the system when the vehicle traveled over an irregular surface. For example, when the vehicle traveled over a large bump, the shock absorber and springs would not be able to absorb all of the vertical deflection and hence the vehicle axle would contact the vehicle chassis, a phenomenon commonly known as "bottoming-out."

To eliminate the aforementioned disadvantages, attempted solutions included the use of condual (concentric-dual) tires or large, low pressure tires to attain high mobility of the vehicle. Since the air volume and surface of these tires are both large, the cushioning effect is likewise large, and improved mobility is effected. The deflection of low pressure, high volume tires rolling over bumpy terrain does not transmit as much wheel jounce to the suspension components, such as axles, springs, arms and stops, as would be transmitted by higher pressure, lower volume tires under the same conditions of speed and terrain. Due to the large size of the tires, however, this attempted solution is economically disadvantageous. Moreover, large vehicles with large wheels will often continue to oscillate in a vertical direction much in the manner of a rubber ball. Military vehicles in particular, must traverse extremely rugged terrain. This results in the vertical displacement portion of the vehicle suspension system being subjected to the extreme vibratory motion. As is well known, the suspension system is often unable to withstand the vertical displacement and hence the vehicle will "bottom-out." When traveling over extremely rugged terrain, the force with which the axle meets the stops placed on the bottom of the vehicle chassis is extremely large. This results in the stops and suspension components deteriorating very rapidly.

Accordingly, it is the object of this invention to eliminate the afore-mentioned disadvantages.

It is another object of this invention to enable the elimination of the aforementioned stops which are used in a conventional suspension system.

It is another object of the invention to provide a wheeled vehicle of high mobility, having superior suspension durability.

It is still another object of the present invention to provide a high mobility wheeled vehicle which is safe and reliable, while having superior suspension capability without increasing vehicle cost, weight, and complexity.

It is a further object of the invention to provide a simple and inexpensive means to prevent the vehicle from "bottoming-out."

Other objects and advantages of the present invention will become apparent to those ordinarily skilled in the art by the following description when considered in relation to the accompanying drawing of which:

Figure 1:
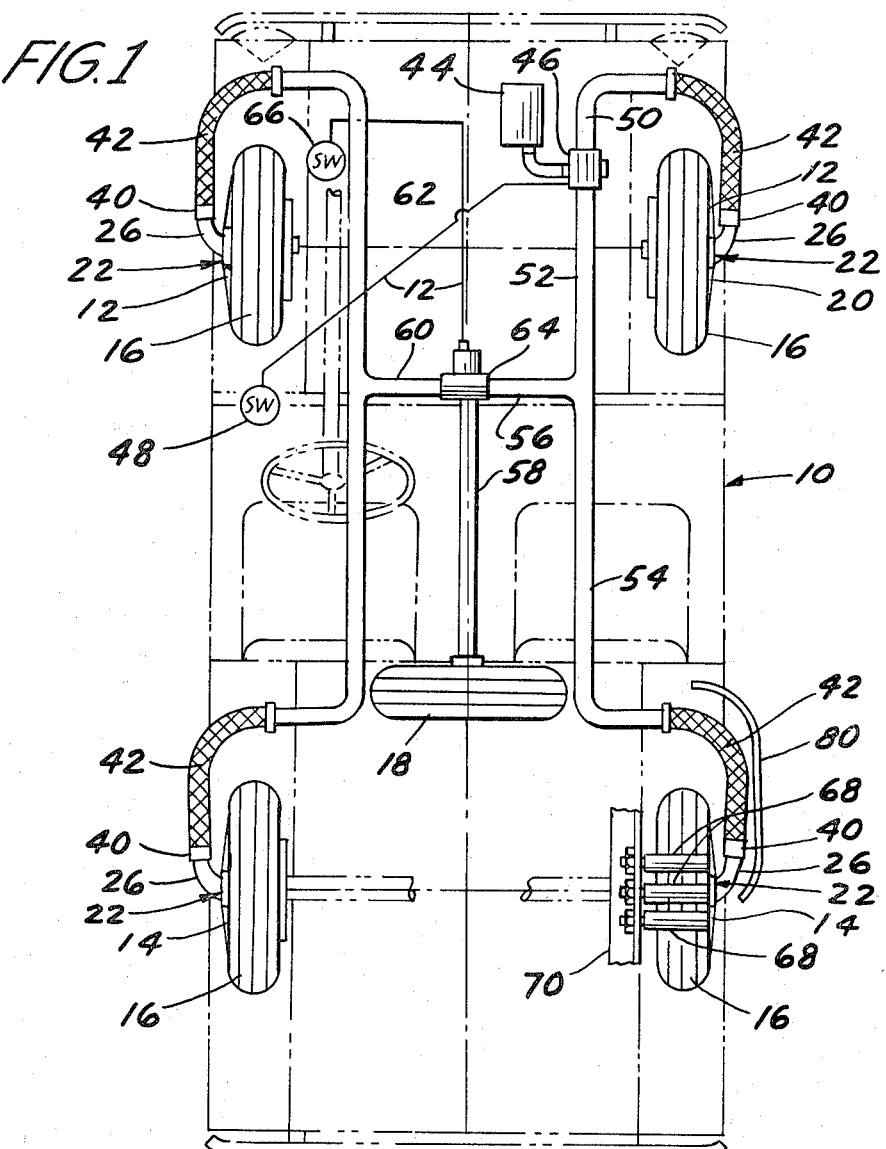
FIG. 1 is a plan view of the vehicle incorporating the new and improved suspension system according to the invention, with the vehicle shown in phantom.

Briefly in accordance with the invention, it has been discovered that a suspension device has been provided for improving vehicle mobility. The device, according to the invention, incorporates a travel limiting and cushioning means which is mounted to the vehicle and has at least a portion thereof disposed about the vehicle tires. The portion of the device which is mounted vertically adjacent the tire interrupts the upward movement of the tire thereby limiting its extreme vertical displacement and allowing the tire to act as a cushion stop. This has the additional effect of increasing the capacity for wheel displacement, the consequence of which will improve vehicle mobility. The device may be incorporated in a vehicle which utilizes an automatic pressure regulating system for pneumatic tires. Although conventionally, the automatic pressure regulating system is utilized solely to control the air pressure in the respective tires for such purposes as safety and tire stamina, the use of the automatic control apparatus according to the present invention is utilized primarily for the purpose of improving the suspension capability of the vehicle. The combination of the travel limiting means and the apparatus for controlling the air pressure in tires permits a greater tire deflection with an accompanying reduction in dynamic loads being introduced into the suspension components and the vehicle proper.

This system also has the advantage of decreased cost, flexibility, space, weight, safety, durability and reliability over the prior art systems. With respect to the space and cost factor, the standard low volume tires that are used conserve vehicle space and cost. In addition, lower maintenance of this suspension system necessitates an additional cost savings. Respecting reliability, an advantage is also obtained in the capability of being able to operate when the tires have punctured since the apparatus for controlling the air pressure in the tires can supply air for small leaks as the vehicle continues to travel, and only large "blow-outs" will prevent the vehicle from moving. The flexibility of the variable tire air pressure is an advantage in that the driver is capable of changing tire pressure for sand, snow, mud, ice, cross-country and highway conditions very rapidly when the need arises. Safety aspects of this vehicle include the braking and lowering of the center gravity available to the driver by quickly exhausting tire air in an emergency, thereby providing for a faster stop in the event of an emergency. The weight advantage results from the reduction in the mass of the suspension components and tires since more energy is absorbed by air volume. The durability of major components is increased by preventing stresses beyond their yield which is a definite advantage of the invention. The elimination of the excessive force of the axle against the stops further necessitates a longer life suspension system in addition to the smoother ride resulting therefrom.

Referring now to the drawings wherein similar numerals will refer to similar parts of the various figures, a vehicle 10 is shown in phantom in FIG. 1 having front wheels 12 and rear wheels 14. Mounted on the front and rear wheels are tires 16 whereas the spare tire is shown at 18. As can best be seen in FIG. 2, a pneumatic breather 20 is provided in each of the vehicle wheels. The breather 20 consists of a tubular assembly, such as the spokes 21, which for tubeless tired wheels, simply connects holes in the wheel rim with the rotary air coupling, shown generally at 22. For tube-type tires, a special innertube having additional air outlets is substituted for the standard innertube. The openings to the tires at wheel rim 24 are of sufficient size and spacing to allow relatively free breathing of the air in the tire as the vehicle passes over bumps and compresses the tire. By means of example only, and not limitation, four spokes 21 of one inch tubing, equally spaced around the rim, are considered sufficient to maintain the desired air pressure.

Figure 2:
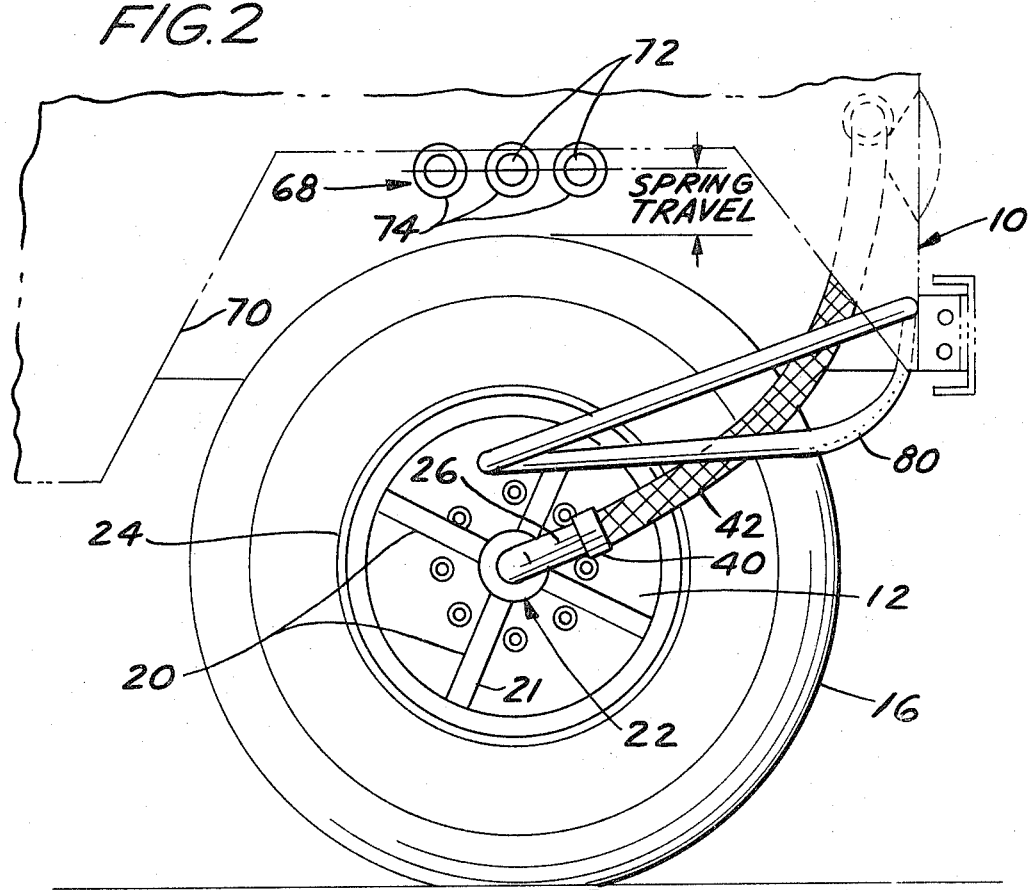
FIG. 2 is an elevational side view of one of the vehicle wheels in which the new and improved suspension system is incorporated.
Figure 4:
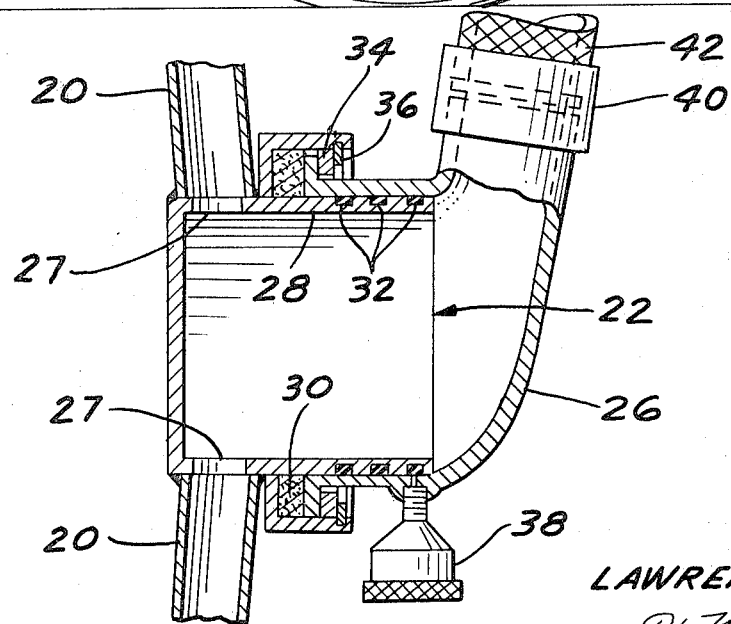
FIG. 4 is an elevational view shown partly in section, of the rotary coupling housing according to the invention.

A rotary coupling housing shown generally at 22, in FIGS. 1 and 2 and more specific in FIG. 4, comprises elbow shaped portion 26 and rotating portion 28. The spokes 21 are secured to rotating portion 28 about apertures 27 in any suitable manner such as by welding. A dust seal 30 and ring seals 32 are provided in a manner which is well known in the art. Ring seals 32 will allow free rotation without leakage at the pressure involved. Suitable selection of materials and construction of the seals will insure durability and environmental compatibility with the vehicle. A thrust bearing is shown at 34 and is provided to absorb lateral forces of the two relatively movable portions of the coupling. The snap ring 36 is provided to secure the thrust bearing 34. As can be seen in FIG. 4, a grease fitting 38 is also provided to adequately lubricate the relatively movable portions of the coupling.

Attached to rotary coupling 22 by means of union 40, is a flexible hose 42. Hose 42 may be constructed of any flexible material such as a covered woven cord with a woven or spiral metal jacket wrapped around the outside to resist mechanical damage. By means of hose 42, air is transmitted to and from the tire through coupling 22 and spokes 21.

As can be seen in FIG. 1, a piping system is shown, comprising pipe or tubing 50, 52, 54, 56, 58, 60 and 62 suitably attached to the vehicle. As shown in the drawing, an air compressor 44 is suitably attached to the piping system. This compressor may consist of a standard vehicle air compressor or a conventional belt driven compressor. A reservoir, or air storage tank and pressure regulator, are desirable, however, not essential. An "exhaust or fill" valve 46 is provided for permitting air to enter or leave the system by means of tubes 50 and 52. As shown in the drawing, the compressor 44 is also connected to the valve 46. Valve 46 is a solenoid type valve for either lowering tire air pressure by exhausting air from the piping system or raising tire air pressure by adding air to the vehicles air reservoir and/or air compressor 44. A tire pressure and control air gauge 48 is provided to control valve 46. Control switch and air gauge 48 consists of an electrical switch and a pressure air gauge mounted on the dash or instrument panel to enable the vehicle operator to direct electrical energy from the vehicle battery to the exhaust or fill valve 46. Air pressure in tires 16 and 18 is thereby controlled by suitable actuation of the valve 46. By means of the control switch and air gauge 48, the air pressure in the tires may be directly read on a continuating basis and controlled.

Incorporated between the right and left hand portions of the piping system is a solenoid operated cut-off valve 64. As shown in the drawing, portions 56, 58, and 60 of the piping system are connected to cut-off valve 64. Operation of valve 64 is controlled by switch 66 which is operated in response to turning of the vehicle. The primary purpose of this valve is for maintaining proper air pressure in the vehicle wheels on either side of the vehicle when the vehicle is negotiating a turn. If a sharp turn is negotiated at a high speed, the weight of the vehicle is borne mainly by the wheels on the outside of the curve. Consequently, these outermost tires should have a correspondingly higher air pressure than under normal circumstances.

Turning now to FIGS. 1 and 2, means for limiting the upward movement of the vehicle tires is provided as shown at 68. The travel limiting means shown in FIG. 2 generally comprises rollers 74 rotatably mounted on spindles 72 which are secured to the vehicle chassis in any suitable manner. The heavy duty rollers 74 which are mounted above each wheel of the vehicle, limits the wheel's upward travel and provides additional tire compression upon deflection of the wheel caused by striking a bump at high speeds.

The system as previously described enables air from the front tires to escape into the rear and spare tires upon the front tires negotiating obstructions in the travel surface. Obviously, when the rear tires negotiate an obstruction in the travel surface the system causes the rear tires to be deflected, air from the rear tires will escape into the remaining portion of the system. By means of the travel limiting device 68, which has a portion thereof vertically disposed above the tire as shown in FIG. 2, the vertical displacement of the tire will be limited depending on the distance between the travel limit 68 and the respective tires. When the tires contact the travel limiting means 68, the tires will be compressed to a higher degree than exists as a result of traversing a surface irregularity. This additional tire compression will result in a greater air volume being directed into the air volume storage and hence, greater damping of the impact will be effected. Additionally, the location of the travel limiters above the wheel will prevent the axles of the vehicle from striking the bottom of the chassis and "bottoming-out" before taking full advantage of the available space for wheel travel.

Figure 3:
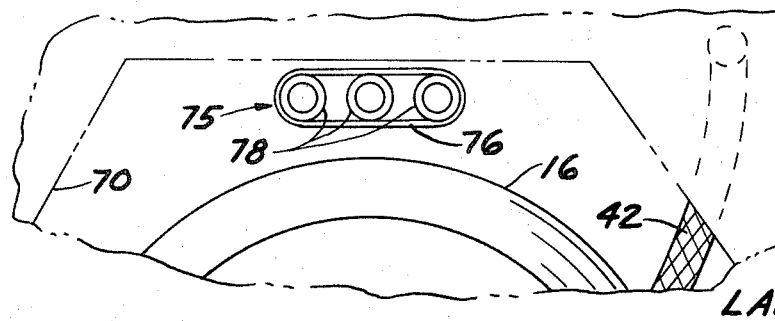
FIG. 3 is an alternate embodiment of the vehicle suspension device according to the invention.

Referring now to FIG. 3, a second embodiment of the travel limiting means is disclosed at 75 comprising a belt 76 mounted on rollers or spindles 78 which are fixedly mounted to the vehicle chassis 70. The operation of this embodiment is similar to the above described system shown in FIG. 2. When the tire is deflected in a vertical direction, it will contact the travel limiting means 75, thereby limiting its vertical movements. This of course will increase the compression of the tire and hence will result in a greater air volume being directed into the remaining system. The cushioning effect will again result.

Both of the travel limiting means 68 and 75 are anti-friction devices. The main purposes for using this type of system is to eliminate or reduce tangential forces being exerted on the vehicle tire while the vehicle is in movement. If a nonmovable travel limiter were used, the vehicle would be required to travel at slow speeds to insure safe operation of the vehicle. Other anti-friction devices could likewise be use such as a transfer ball as is commonly used in table top conveyers or similar ball bearing systems. As shown in the drawing, a brushguard 80 may also be provided to protect the flexible hoses and rotary couplings from damage by scraping on obstructions near the vehicle.

In actual operation of this system, the driver or operator of the high mobility vehicle would pre-set the air pressure in the vehicle tires to the optimum value as determined by the tire manufacturer's recommendations for the type of terrain or road encountered. Generally a high pressure would be used for level, smooth roads and low pressure for rough cross-country terrain.

As the vehicle progresses over bumpy terrain, both the air pressure and the volume of air will vary. If large ruts, ditches, etc., are encountered, the air volume will decrease while the air pressure increases. The air pressure in the tires is not restricted in each individual tire to increase in value in accordance with ratio of the initial air volume over the compressed tire volume for a single tire, but it would only rise in proportion to the ratio of the total air volume in the entire system to the compressed tire volume, a much smaller value. For example, if each tire has 5,000 cubic inches of air, and five tires plus piping system have a total of 26,000 cubic inches, a 2,000 cubic inch deflection of a tire would yield only 26,000/24,000 or a 108 percent pressure increase instead of 5,000/3,000 or a 167 percent pressure increase. In addition the throttling effect of air flow in the air piping system will reduce or dampen wheel bounce.

When the vehicle traverse a very large or extreme irregularity in the traverse surface, the wheel will deflect vertically upward until it contacts the travel limiting device. This will cushion the impact of the bump, dampen oscillations of the suspension system, and also determine the vertical limit to which the wheel may be vertically displaced. The anti-frictional nature of the travel limiting device will not substantially interfere with the rotational movement of the respective tires. The additional tire compression caused by the tire engaging the travel limiting device will result in a greater air volume being directed into the total air volume storage system and greater dampening of the impact will result. This system will thus preclude the axle from bottoming-out. This also precludes and eliminates the deterioration of the rubber stops which was prevalent in prior art systems. This system has also eliminated cracked vehicle frames which resulted from the system bottoming-out against the rubber stops. This system has been of particular value in systems in which it is desirable to eliminate wheel wells which normally protrude into the bottom surface of a cargo vessel. Through the use of this system, the distance between the tires and the vehicle body may be less than that of the prior art system, hence the cargo body will have a lower profile which is desirable for loading purposes.

Because this system has eliminated the serious nature of the cracked frames and broken rubber stops as a result of the system bottoming-out, transport vehicles can now be manufactured without a "stiff" suspension system as was previous required. This has a distinct advantage of providing a much softer riding suspension system in transport vehicles which has not been known in the prior art.

Although the travel limiting means has been shown as being comprised of movable rollers or a belt, it should be understood that any system of anti-frictional elements may be utilized to provide this function and should not be limited to the two embodiments shown.

While each of the travel limiting systems have been shown with the use of three rollers, it should be understood that any number of rollers can be suitably utilized to accomplish this purpose.

It should be further understood that the structure for "breathing" air to and from the tire may be built into the wheel rim at manufacture, rather than adding it as a modification to the rim. This structure may be suitably modified according to the particular wheel involved to provide greater space and accessibility for changing tires.

The sealed wheel bearing and combination rotary air valve may be attached to the inside of the wheel, thereby eliminating exterior hoses and brushguards. Piping systems and reservoirs may be built into the vehicle frame structure and air bags may be substituted for conventional springs and shock absorbers.

What has been shown, therefore, is a new and improved suspension system which will improve vehicle mobility. This suspension system utilizes existing air in the tires which accompany the vehicle under stress to a storage volume and its subsequent return as a means for reducing shock. This new and improved suspension system also incorporates a novel travel limiting means to limit the amount of vertical displacement of the tire and further cushion the impact. I wish it to be understood that I do not desire to be limited to the exact details of construction shown and described, for obvious modifications will occur to a person skilled in the art.

What I claim is:

1. A suspension device for improving vehicle mobility, for use in combination with a wheeled supported ground vehicle having a sprung part, comprising,
   axle means,
   road wheels having pneumatic tires mounted thereon for the resilient support thereof, said tires constituting the primary suspension structure,
   bearing means supporting said wheels on said axle means,
   suspension means supporting said sprung part from said axle means, in superjacent relationship and constituting a second suspension structure,
   said suspension means permitting vertical displacement of said road wheels towards and away from said sprung part,
   travel limiting means secured to said sprung part, comprising,
   at least one spindle overlying a respective one of said tires,
   a freely rotatable roller journaled on each said spindle with the lowermost surface of said roller vertically spaced from the adjacent surface of said tires a distance less than the spacing of said axle means from the under surface of a superjacent sprung part when said suspension means is in a first predetermined condition and said second suspension structure acts as a principal support for said sprung part, and in contact with said adjacent surface when said suspension means is in a second condition due to intermittent vertical displacement of said wheel toward said sprung part when said wheel encounters raised ground obstructions, whereby,
   in said second condition said roller limits the stress applied to said axle and bearing means and said primary suspension structure becomes the sole suspension structure for resiliently supporting said sprung part and axle means and wheels on said ground, transferring ground pressure load through the pneumatic tire to the sprung part.

References Cited

UNITED STATES PATENTS

| Re. 24,272 | 2/1957 | Albee | 180—74 X |
| 676,409 | 6/1901 | Berger | 180—74 |
| 1,394,328 | 10/1921 | Miller. | |
| 2,802,541 | 8/1957 | Albee. | |
| 2,909,244 | 10/1959 | Kraft | 188—176 X |

A. HARRY LEVY, Primary Examiner

U.S. Cl. X.R.

152—416